US012728784B2

(12) United States Patent
Hypes et al.

(10) Patent No.: US 12,728,784 B2
(45) Date of Patent: Sep. 8, 2026

(54) CARGO DECKING ELEVATION SYSTEM

(71) Applicant: American Manifest, Inc., Zeeland, MI (US)

(72) Inventors: Chelsea Hypes, Zeeland, MI (US); Bradley C. Schaefer, Coloma, MI (US); Timothy A. Maillet, Zeeland, MI (US)

(73) Assignee: American Manifest, Inc., Zeeland, MI (US)

( * ) Notice: Subject to any disclaimer, the term of this patent is extended or adjusted under 35 U.S.C. 154(b) by 300 days.

(21) Appl. No.: 18/548,424

(22) PCT Filed: Mar. 3, 2022

(86) PCT No.: PCT/US2022/018664

§ 371 (c)(1),
(2) Date: Aug. 30, 2023

(87) PCT Pub. No.: WO2022/216385

PCT Pub. Date: Oct. 13, 2022

(65) Prior Publication Data

US 2024/0051449 A1 Feb. 15, 2024

Related U.S. Application Data

(60) Provisional application No. 63/156,495, filed on Mar. 4, 2021.

(51) Int. Cl.
*B60P 1/02* (2006.01)

(52) U.S. Cl.
CPC .................................... *B60P 1/02* (2013.01)

(58) Field of Classification Search
CPC ........................................ B60P 1/02
USPC ........................................ 414/679
See application file for complete search history.

(56) References Cited

U.S. PATENT DOCUMENTS 3,680,711 A 8/1972 Brucker
5,297,208 A 3/1994 Schlafly et al.
5,915,913 A * 6/1999 Greenlaw .............. B61D 47/00
414/679
5,938,382 A 8/1999 Andre et al.
(Continued)

FOREIGN PATENT DOCUMENTS

DE 102006043201 A1 3/2008

OTHER PUBLICATIONS

International Search Report for PCT/US2022/018664, mailed Feb. 2, 2023; 3 pp.

*Primary Examiner* — Terrell H Matthews
(74) *Attorney, Agent, or Firm* — Bodman PLC

(57) ABSTRACT

A cargo decking elevation system includes an even number of vertical track mounts at opposite, facing interior wall surfaces. A decking beam is disposed between two vertical track mounts. A lift assembly is disposed at each of the two vertical track mounts. The lift assemblies raise, lower, and support the decking beam. A controller receives inputs from a user for providing commands to the lift assembly. The lift assembly includes an engagement element configured to engage and retain an end of the decking beam, a lifting means for raising and lowering the engagement element, and a guide along which the engagement element travels by operation of the lifting means to raise or lower the decking beam.

20 Claims, 7 Drawing Sheets

(56) References Cited

U.S. PATENT DOCUMENTS

| | | | | |
|---|---|---|---|---|
| 8,002,128 | B2 * | 8/2011 | Kern | B65D 19/12<br>211/194 |
| 9,033,630 | B2 * | 5/2015 | Garrigus | B60P 7/15<br>410/143 |
| 9,505,337 | B1 * | 11/2016 | Squyres | B61D 45/002 |
| 2016/0202111 | A1 * | 7/2016 | Fahey | B65D 90/143<br>254/89 R |
| 2019/0270400 | A1 * | 9/2019 | da Rosa | B60P 7/15 |

* cited by examiner 100
104
120

120
104a
104b
102
106
108b
108a

CARGO DECKING ELEVATION SYSTEM

CROSS-REFERENCE TO RELATED APPLICATIONS

This application is a U.S. National Stage Application under 35 U.S.C. § 371 of International Application No. PCT/US2022/018664, filed Mar. 3, 2022, which claims the benefit of and priority under 35 U.S.C. § 119(e) of U.S. Provisional Patent Application No. 63/156,495, filed Mar. 4, 2021, the contents of which are hereby incorporated herein by reference in their entireties.

TECHNICAL FIELD

The present disclosure relates to cargo compartments, and more particularly to cargo decking elevation systems.

BACKGROUND

It is known to provide a vertical track system and one or more beams or bars in the cargo area of a straight truck, box truck, or shipping container, such as described in U.S. Pat. Nos. 3,680,711 and 9,033,630. Typically, vertical track systems are installed or integrated into the side walls of a cargo area and provide engagement points for decking beams to be manually fixed thereat, such that an installed beam or bar spans the width of the cargo area between two vertical tracks and provides a load-bearing, horizontal support for cargo. Thus, the beams or bars may hold cargo at a height above the floor of the trailer (as dictated by engagement points on the vertical tracks), but must be manually installed and re-adjusted.

SUMMARY

The present disclosure provides a cargo decking elevation system that uses lift assemblies to support a decking beam or load bar that spans across a cargo area and to raise and lower the decking beam by operation of the lift assemblies, such as to optimize use of the upper volume of the cargo area. The lift assemblies may mount to vertical track mounts or may integrate with walls on opposing sides of the cargo area. The lift assemblies have an actuating mechanism that operates to raise or lower a carriage unit along a guide. The carriage units attach to ends of the decking beam, such that the actuating mechanism raises or lowers the decking beam in response to operation control signals, such as user inputs at a controller. Thus, a cargo decking elevation system in accordance with the present disclosure eliminates or substantially reduces the need for manual installation and adjustment of decking beams at a vertical track system or vertical track mounts in a cargo area, provides means for raising and lowering installed decking beams both before and after cargo has been loaded, and also optimizes usage of the cargo area.

According to one aspect of the present disclosure, the lift assemblies may be disposed at opposing walls of a transportation cargo compartment and each may include a carriage unit and an actuating mechanism that operate to raise and lower the carriage unit vertically along the respective wall. The ends of the decking beam engage the carriage units of the lift assemblies, such as with the use of decking beams having retaining tabs that releasably attach to engagement portions of the carriage units. A controller receives inputs from a user for providing commands to the lift assemblies, such that in response to user inputs, the actuating mechanisms of the lift assemblies operate to raise or lower the decking beam via movement of the carriage units.

Implementations of the disclosure may include one or more of the following optional features. In some implementations, each lift assembly has an elongated guide engaged with the carriage unit, such that the carriage unit is movable vertically along the elongated guide. In some examples, the elongated guide includes a threaded spindle and the carriage unit comprises a spindle nut assembly with a threaded portion engaged with the threaded spindle. The spindle nut assembly may also include an engagement portion that receives an end of the decking beam. The actuating mechanism may include a motor attached at an upper end portion of the threaded spindle and operable to rotate the threaded spindle, which causes the spindle nut assembly to travel along the threaded spindle and raise or lower the decking beam.

In some implementations, each lift assembly includes a track and a threaded spindle disposed adjacent to and along the track. The carriage unit may be movably engaged with the track and threadably engaged with a threaded spindle for the carriage unit to move linearly along the track in response to rotational movement of the threaded spindle.

In additional implementations, the lift assemblies include a wire electrically connected between the actuating mechanisms of the lift assemblies. The controller may be configured to communicate with the actuating mechanisms over the wire for simultaneous raising or lowering the carriage units to move the decking beam in a horizontal orientation. In some examples, a lighting unit is disposed at one of the lift assemblies, such as along the wire extending between lift assemblies.

Further, in some implementations, a sensor is integrated with at least one of the lift assemblies to determine a load supported by the corresponding decking beam. In some examples, the sensor may be used to determine the vertical position of the decking beam relative to the walls of the transportation cargo compartment. Also, in some examples, the sensor may be used to determine a load at the decking beam and generates an output regarding the determined load.

In some implementations, a second pair of lift assemblies is disposed at the opposing walls of the transportation cargo compartment and engage a second decking beam at spaced distance from the first decking beam. In response to user inputs at a controller, the first and second pairs of lift assemblies operate simultaneously to raise or lower the first and second decking beams in horizontal alignment to support a cargo item suspended between the first and second decking beams.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference symbols in the various drawings indicate like elements.

DETAILED DESCRIPTION

Figure 1:
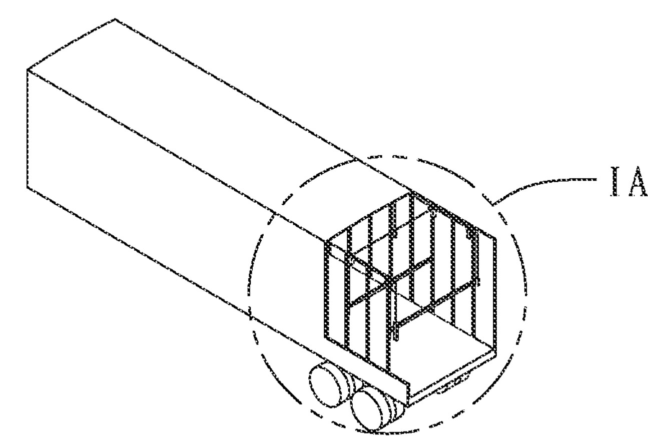
FIG. 1 is an upper left perspective view of a cargo trailer having a cargo decking elevation system with a portion of the trailer cut away to show components of the system.

Referring now to the drawings and the illustrative examples depicted therein, a transportation cargo compartment is shown with a cargo decking elevation system in accordance with the present disclosure. The transportation cargo compartment may be embodied in various forms, such as a rail car, shipping container, airline cargo area, box truck, van, cargo trailer, or the like, as shown for example in FIGS. 1 and 2. It is also contemplated that the cargo decking elevation system disclosed herein may be installed in other stationary structures, such as warehouses, garage bays, or the like. A vertical track system, such as an E-track system, may be disposed at the interior walls of the transportation cargo compartment that border the longitudinal sides of the cargo area. Lift assemblies are installed or integrated at the interior walls, such as by mounting to track mounts of the vertical track system. Decking beams may engage two opposing lift assemblies and span across the cargo area between the two lift assemblies. The decking beams may be loaded with a cargo item and used to support the cargo item at a suspended horizontal position above the floor of the cargo area. To adjust the vertical position of the decking beams, an operator may provide input to a controller that operates to send command signals to the lift assemblies that raise or lower the decking beam. For example, a master switch may be present at the opening of the cargo compartment that electrically communicates with the lift assemblies, such as to provide master control of raising and lowering of the decking beams via the lift assemblies. Thus, the decking beams may be lowered to a desired height (such as at or near the floor of the cargo compartment), a cargo item may be loaded onto the decking beams, and the decking beams may be raised to a desired height (such as to an elevated position that locates the supported cargo item near the ceiling of the cargo compartment), providing additional area below the decking beams for additional cargo items. Additionally, if a user does not wish to load cargo onto the decking beams, the bars may be raised or lowered to a desired height during transport of cargo to, for example, store the bars out of the way at the ceiling or use the bars as spacers or supports between different groupings of cargo. Thus, a cargo decking elevation system in accordance with the present disclosure provides several advantages, including less frequent and/or eliminated need of manual installation of decking beams at a vertical track system or vertical track mounts in a cargo area, a provided means for raising and lowering installed decking beams both before and after cargo has been loaded, and also optimized usage of the cargo area.

Manually installing decking beams is difficult, cumbersome, and dangerous. The bars are heavy, long, and must be aligned into correct, corresponding slots along each vertical track mount to provide a level support for cargo. Misaligning the two sides of a decking beam requires readjustment because an uneven or improperly seated decking beam may result in shifted cargo, damaged cargo, and/or injury to the installer. For example, improperly installed decking beams can become dislodged resulting in the bar falling or the cargo it was supporting falling, which can injure people and damage cargo.

Additionally, it is not uncommon for a worker to install the decking beams at the vertical track system and begin loading cargo onto the decking beam only to realize that a different positioning of the decking beam is required, thus resulting in inefficiencies from the need to unload the cargo and reposition the bar to the desired position. Furthermore, frequently installing, uninstalling, and/or repositioning the decking beam (e.g. for different sized cargo or because of improper initial installation) commonly results in injuries due to the frequent handling of the heavy and cumbersome bars and/or potential misalignment of the bars upon installation. When not in use the decking beams have to be stored. Often there is no designated place for them in a cargo area and they are stacked on the floor of the trailer, resulting in a hazard from shifting and/or unsecured bars and presenting an obstacle to work around. Companies often forego the benefits of such vertical track and decking beam systems (such as additional or optimized cargo space) because of the risk of injury to workers and/or cargo and added inefficiencies.

Even when in use, the limitations of traditional decking beam systems far from maximize the use of the cargo area's spatial capacity. This results in more trucks on the road being needed to carry the same amount of cargo leading to traffic congestion, money and time loss, and especially, a significant environmental impact. According to the EPA (EPA Article 1 EPA SmartWay Art. 2) the transportation sector is responsible for over 50% of nitrogen oxides (NOx) total emissions inventory in the U.S, over 30% of volatile organic compounds (VOCs) emissions in the U.S, and over 20% of particulate matter (PM) emissions in the U.S, with shipments expected to increase 23.5% by 2025, and 45% by 2040. A system in accordance with the present disclosure optimizes the internal space of the trailer while eliminating the manual operation of decking beams. This saves loading, unloading, installation and transit time across the board. The increased efficiency reduces the number of trucks on the road, resulting in lowered emissions and better EPA compliance.

A cargo decking elevation system in accordance with the present disclosure provides safe and automated raising and lowering of decking beams positioned at a vertical track system or vertical track mounts within a cargo area (such as at a cargo truck or shipping container). The cargo decking elevation system may be installed at the interior walls of a cargo area or integrated with an already existing vertical track (E-track) system. The system includes vertical track mounts disposed at opposite and facing interior walls of a cargo area such that one track mount may be directly across the cargo compartment from another track mount. The vertical track mounts substantially span the height of the interior wall, from at or near the floor to at or near the ceiling of the cargo area. Engagement points are disposed at regular intervals along the mounts and substantially span the entire length of each mount. These engagement points may be slots, hooks, simple holes, or any suitable connection point configured to receive an end of a decking beam or other hardware.

To increase the application of cargo decking elevation systems, a system may either be installed in an already existing vertical track system in a cargo area or may comprise vertical track mounts specifically configured towards the present disclosure. Traditional vertical track systems are disposed along the interior walls of a cargo area to provide engagement points for manually installed decking beams or other cargo-related hardware such as tie-down straps. The vertical track mounts are generally disposed at regular intervals, such as every two feet, along the length of the cargo area. Vertical track mounts may be steel or aluminum or any other suitable material to provide support for decking beams, the cargo which they may hold, and any other equipment installed in accordance with the present disclosure.

Cargo decking elevation systems may be installed as frequently as at every vertical track mount in the cargo area or as infrequently (such as only a single system) as desired by a user. As will be discussed further, unlike a traditional, manually installed vertical track and decking beam system, a decking beam in accordance with the present disclosure may not install directly to a vertical track mount, but rather to a mobile portion or piece of a lift assembly disposed at the vertical track. This allows the decking beam to travel freely along the vertical track without being fixed at any given engagement point along the track. This is in sharp contrast to traditional systems where a decking beam is fixed and must be manually moved between engagement points of the track mounts.

It is also contemplated that cargo decking elevation systems may be integrated with a wall or perimeter structure of a cargo compartment. In some examples, the lift assemblies may be installed in the area that the vertical track or E-track components are typically installed. In additional examples, the lift assemblies may include bolting mechanisms to bolt or otherwise fix the lift assemblies to the wall or perimeter structure of the cargo compartment.

A decking beam, which may also be referred to as a load bar or shoring beam, is configured to span the width of the cargo area, attaching to an engagement point on two vertical track mounts (in a traditional system) or a mobile engagement point of a lift assembly according to the present disclosure. The decking beam is generally a horizontal beam configured to provide support to heavy cargo stacked on one or more bars. Cargo may span a length of the cargo area so as to rest on one or more decking beams. Each bar may have a maximum load bearing capacity, such as 2,000 pounds for a single decking beam or 4,000 pounds for cargo across two decking beams. The bars may be extendable or adjustable to fit different width cargo areas or to assist in easier initial installation. According to the present disclosure and as will be discussed further below, the decking beams may engage a carriage unit at each of the vertical track mounts, the carriage unit connected to lift assemblies configured to raise and lower the decking beams. Decking beams compatible with the present cargo elevation system may be universal bars (bars suitable for use with traditional manual systems) or bars specifically adapted for use with an elevation system. Thus, a cargo elevation system may provide decking beams specifically adapted with, for example, a carriage unit, or the system may be adapted to receive universal or traditional decking beams.

A lift assembly attached to each vertical track mount operates to raise and lower the mobile engagement point (carriage unit) and therefore decking beam. Lift assemblies attached to vertical track mounts across from each other (and therefore sharing a decking beam disposed therebetween) operate in tandem so as to raise or lower each side of the decking beam equally. As will be discussed below, the lift assembly or lifting means of the illustrated embodiments comprises a motor, such as a gear drive motor, configured to rotate a threaded spindle about a bearing mount, a spindle nut assembly engaging an end of the decking beam travels along the threaded spindle according to the rotation of the attached motor. However, the decking beam may also be raised and lowered via pneumatic, hydraulic, or any other suitable mechanical means. A controller or switch receives inputs from a user and communicates with the lift assemblies according to the user inputs to enact the raising and lowering functions of a given cargo decking elevation system.

Figure 1A:
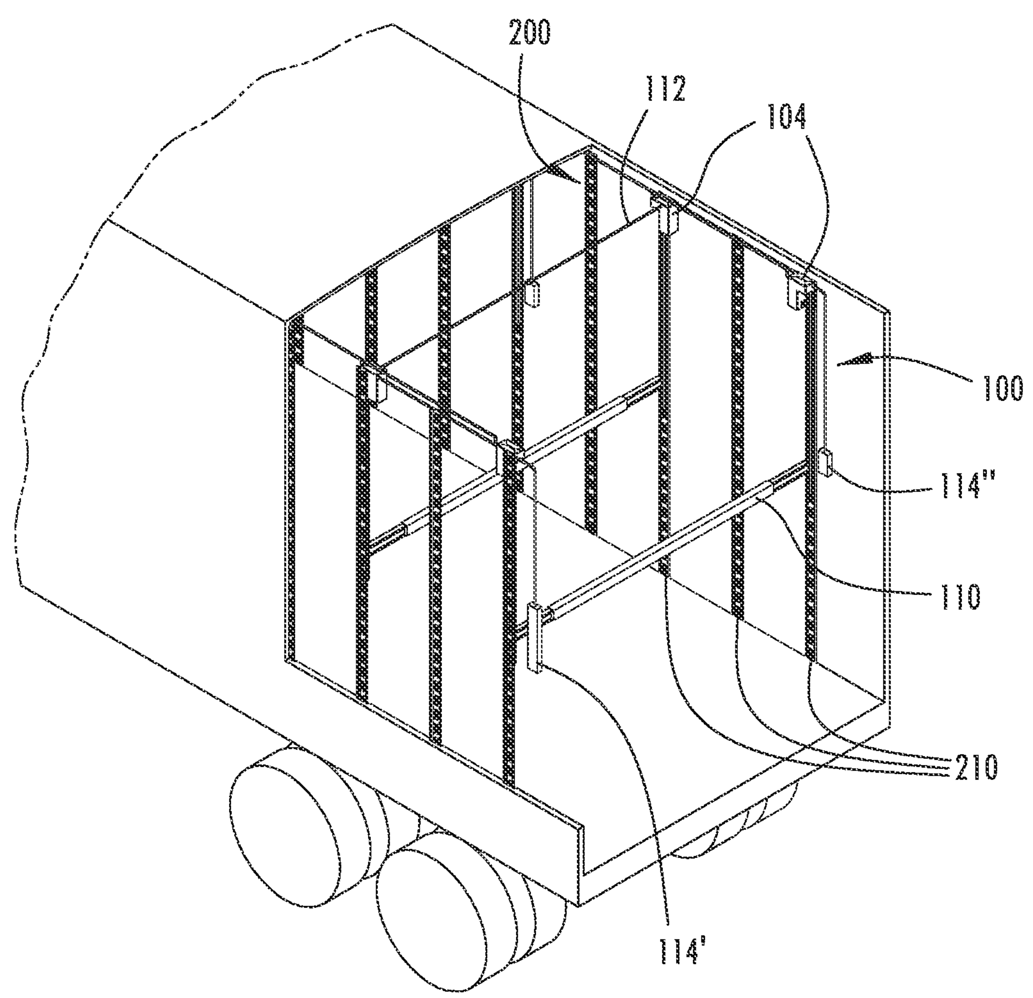
FIG. 1A is an enlarged view of section IA shown in FIG. 1.

Referring to FIGS. 1 and 1A, a lift assembly 100 is disposed in fixed engagement at a vertical track system 200 and is configured to vertically raise and lower a decking beam 110 relative to the vertical track mounts 210. The lift assembly 100 may include a mobile decking beam engagement element configured to engage and retain an end of the decking beam 110. For example, the decking beam engagement element may be a carriage unit 101. The lift assembly 100 includes a lifting means for raising and lowering the decking beam engagement element (and therefore the decking beam) and a guide along which the decking beam engagement element travels when the lifting means is operated to raise or lower the bar engagement element. For example, the lifting means may include a motor 104, such as a gear drive motor, attached to a threaded spindle 106 at one end, the threaded spindle 106 attached to a bearing mount 108 at a distal end from the motor 104. The carriage unit 101 may include a spindle nut assembly that is threadably attached to the spindle 106, such that when the motor 104 rotates the spindle 106 in one direction, the spindle nut assembly 102 moves or displaces up the spindle 106 and when the motor 104 rotates the spindle 106 in the opposite direction, the spindle nut assembly 102 moves or displaces down the spindle 106 with the bearing mount 108 at the end of the spindle 106 enabling free rotation per the motor. Thus, the lifting means may be a screw or helical drive. Preferably, the lift assembly 100 is configured to allow for the spindle nut assembly 102 to be raised or lowered to any discrete location along the threaded spindle 106. Of course, the lift assembly 100 engaged with one end of a decking beam 110 is configured to work in tandem with a lift assembly 100 engaged with the other end of the decking beam 110 so that both sides of the decking beam 110 may be raised and lowered simultaneously, thus providing a level and substantially horizontal support for any cargo that may be loaded on to the decking beam 110 throughout the process of raising and/or lowering the bar and at the desired resting height of the decking beam and loaded cargo. Thus, when the motor 104 of one lift assembly operates to move a spindle nut assembly 102 along its spindle 106 (and thus raise or lower one end of a decking beam 110), a motor 104 of a corresponding lift assembly operates accordingly to move its spindle nut assembly 102 along its spindle 106 in a matching fashion. Although the lifting means of the illustrated embodiment includes a motor driven spindle and spindle nut assembly, a cargo decking elevation system in accordance with the present disclosure may raise and lower decking beams using hydraulic or pneumatic driven systems or any other suitable means for mechanically raising and lowering decking beams. The motor assemblies, or any other given lifting means associated with a cargo decking elevation system, may be wired to and powered directly from the electrical system of the host vehicle and/or an auxiliary battery or generator or any other electrical power source. For example, a cargo decking elevation system may be powered via the host vehicle's electrical system when the vehicle is running and may be powered via an auxiliary battery when the vehicle is not running. In additional examples, the motor assemblies may be wired to and powered by a conventional building power circuit, such as at a standard wall outlet (e.g., 110V or 220V). It is also understood that additional examples of the lift assembly may include an alternative lifting means such as a hydraulic lift, chain driven lift, or other mechanical lift.

Figure 2:
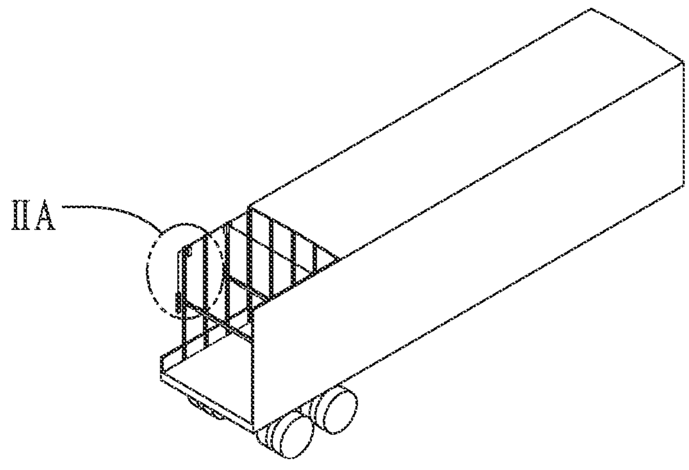
FIG. 2 is an upper right perspective view of the cargo trailer shown in FIG. 1.
Figure 2A:
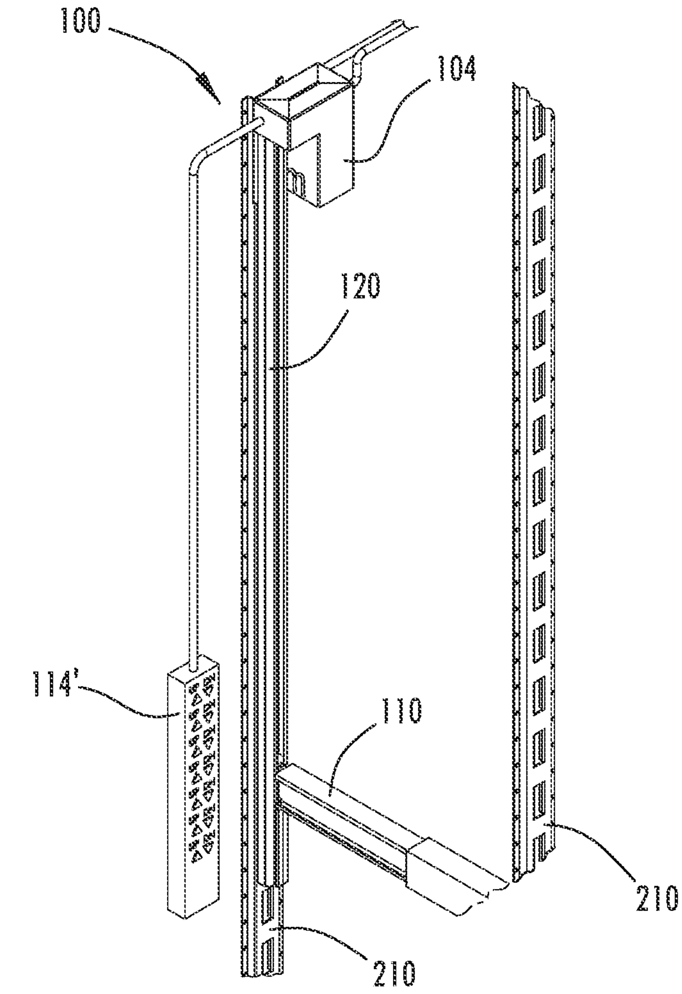
FIG. 2A is an enlarged view of section IIA shown in FIG. 2.

Turning to FIGS. 2 and 2A, the lift assembly 100 may install at a vertical track mount 210 via a shroud 120 configured to attach to a mount 210 at one or more of its engagement points. A shroud 120 may enable a lift assembly 100 to be installed at an already existing vertical track system 200 or may be standard equipment for a lift system providing its own vertical track mount. The shroud 120 may provide structure to which to install a motor 104, spindle 106, bearing mount 108, and any other associated hardware needed for a given lift assembly and also protect the mechanics of a lift system from exposure to the various elements present in a cargo area. As seen in FIGS. 8-11, the shroud 120 may include two pieces which attach to a vertical track mount 210 in a clam-shell-like manner to provide a channel or guide through which the carriage unit 101 engages the decking beam 110. The channel between the two pieces of the shroud 120 allows the spindle nut assembly 102 and thus decking beam 110 to freely travel along the spindle 106 while providing a barrier to the spindle 106, spindle nut assembly 102, and/or engagement point of the decking beam 110 from debris, dust, shifting cargo, and any other inadvertent contact or exposure that could potentially prevent the spindle nut assembly 102 from freely moving along the spindle 106, inadvertently disengage the decking beam 110 from the spindle nut assembly 102, or otherwise cause a malfunction of a lift assembly. The edges of the shroud 120 may include a brush or flexible fin element (e.g., a rubber or silicon blade) to further prevent debris or dust from interfering with the system. Optionally, the top and/or bottom of the spindle nut assembly may include self-cleaning bushings, such as a threaded flexible washer, that is configured to remove dirt, dust, or debris from the spindle immediately before the spindle nut assembly travels over the cleaned portion of the spindle.

Figures 3, 4:
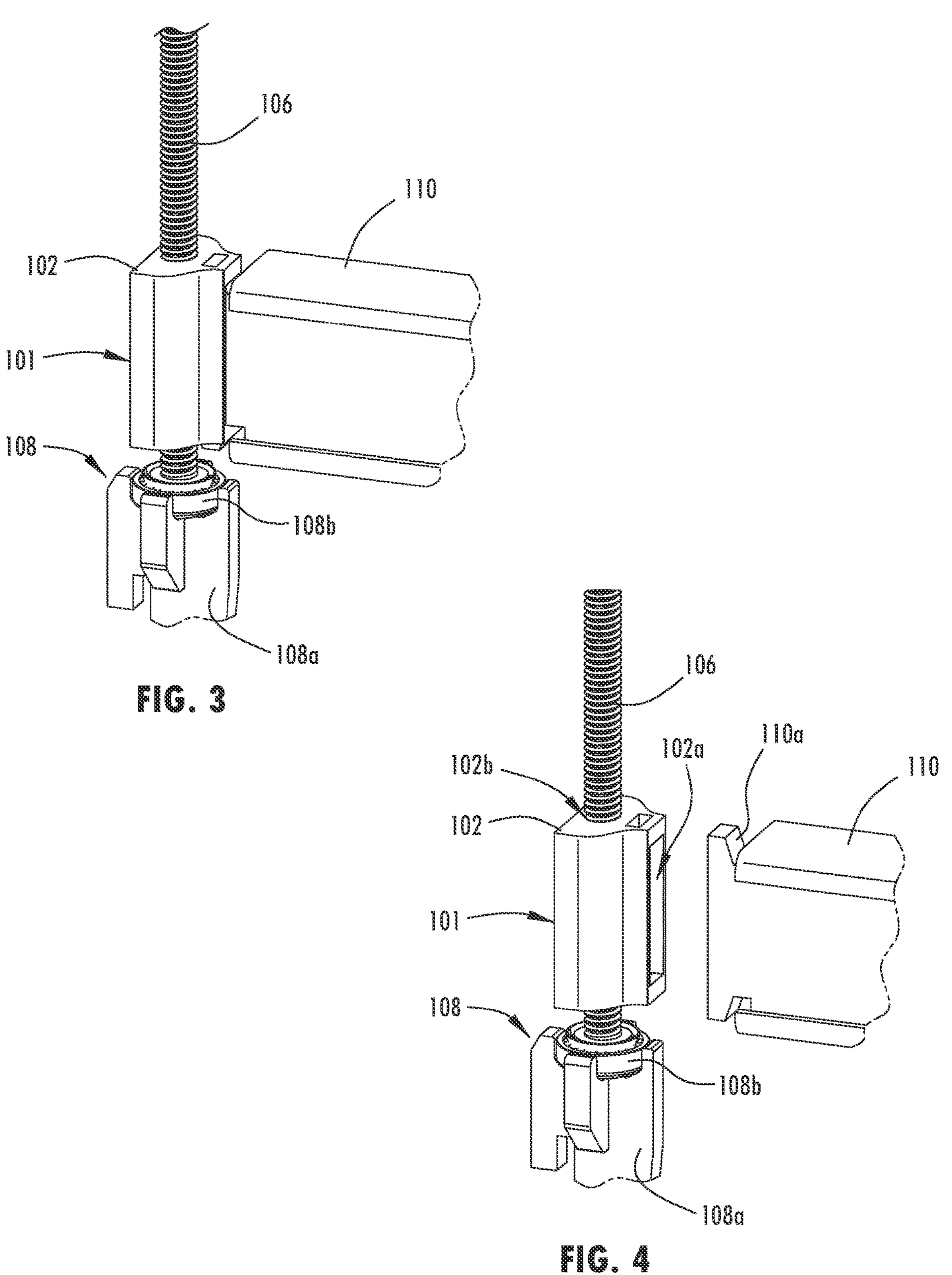
FIG. 3 is a partial perspective view of a lift assembly, showing a bearing mount, spindle nut assembly, spindle, and decking beam of a cargo decking elevation system.
FIG. 4 is a partial perspective view of the lift assembly shown in FIG. 3 with the decking beam disengaged from the spindle nut assembly.
Figure 5:
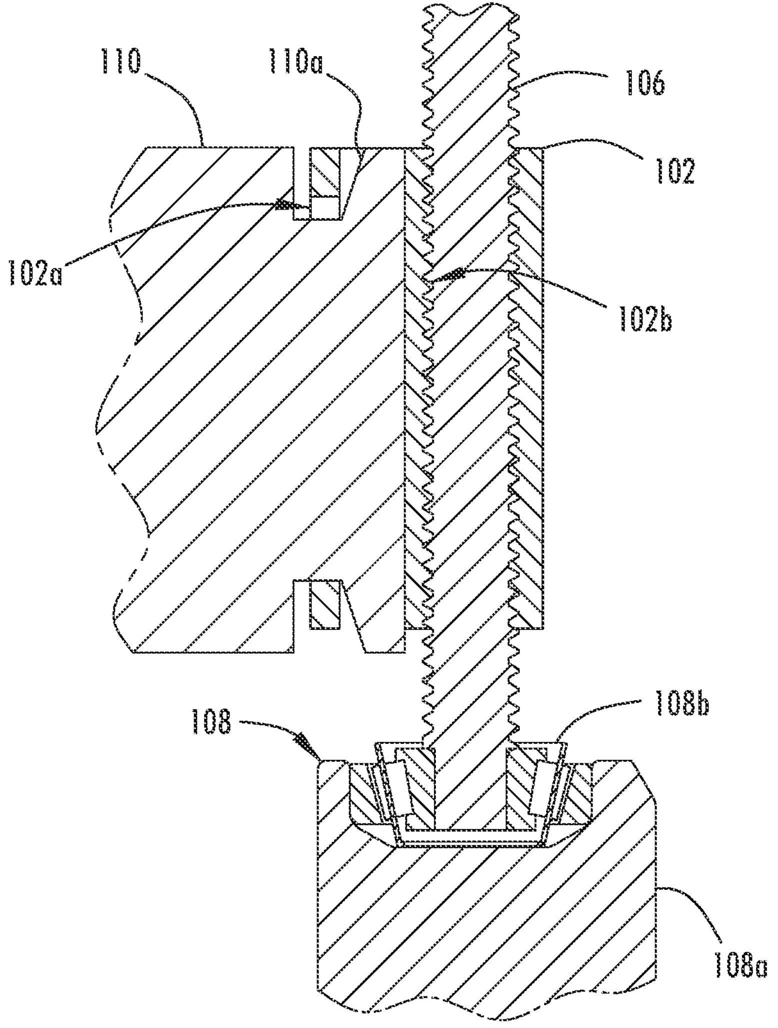
FIG. 5 is a cross-sectional view of the lift assembly of FIG. 3.
Figure 9:
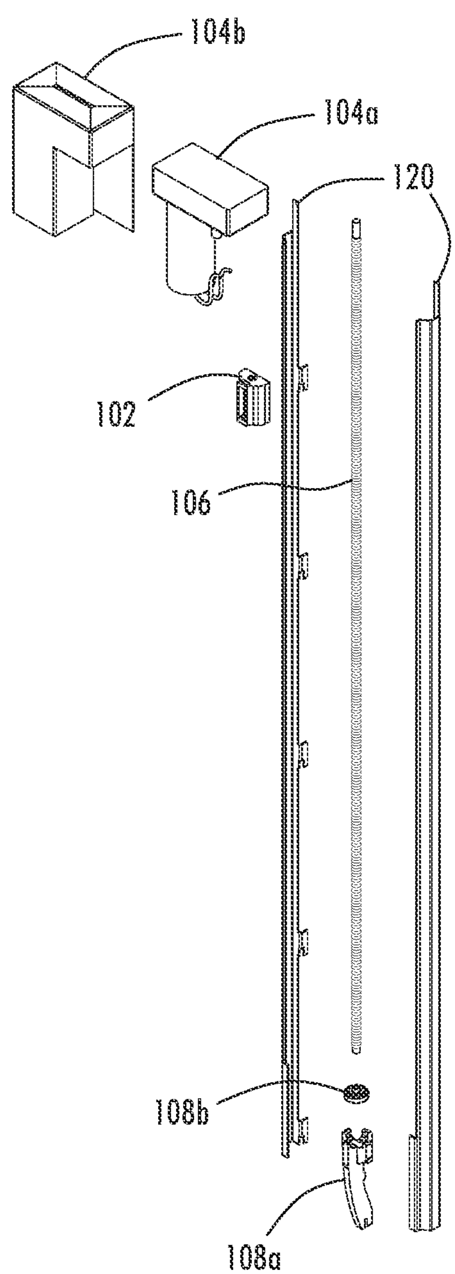
FIG. 9 is an exploded view of the lift assembly of FIG. 8.
Figures 10, 11:
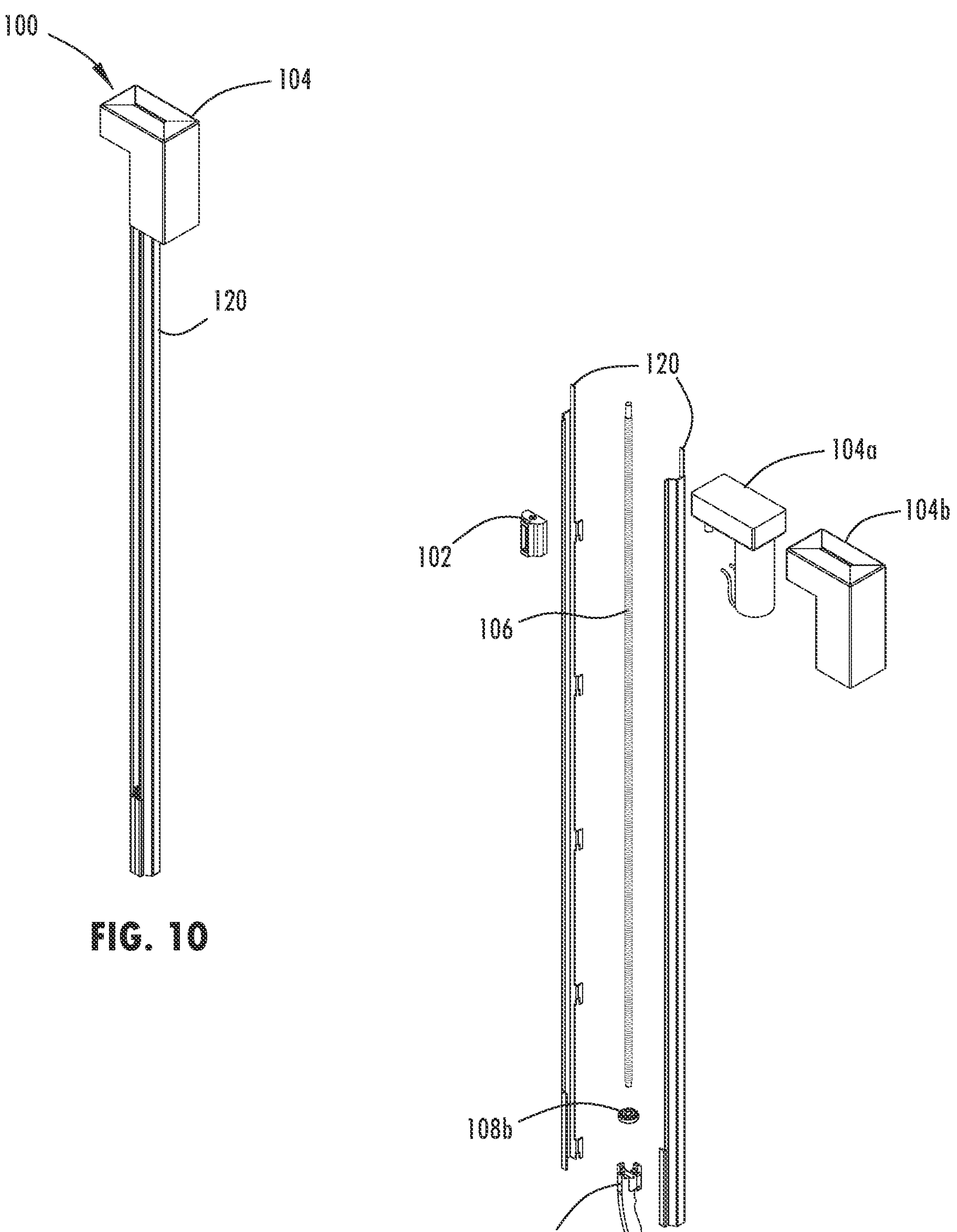
FIG. 10 is a rear upper perspective view of the lift assembly shown in FIG. 8.
FIG. 11 is an exploded view of the lift assembly of FIG. 10.

Referring now to FIGS. 3-5, sandwiched or otherwise disposed between the two pieces of the shroud 120 is a threaded spindle 106 with a spindle nut assembly 102 threadably attached thereat. A bearing mount 108 comprising a bearing mount arm 108*a* and a bearing 108*b* are disposed at a lower end of the spindle 106, distal from the end at which the motor is attached. The bearing 108*b* is shown as a tapered roller bearing with tapers for tangential loads, and in additional examples the bearing may be a different vertical pressure bearing. The bearing 108*b* enables free rotation of the spindle 106 per the motor, thus allowing the spindle nut assembly 102 to travel up and down along the spindle 106 within the shroud 120. As seen in FIGS. 9 and 11, the bearing mount 108 may be received between the two pieces of the shroud 120 and attached thereat or the bearing mount assembly may otherwise be attached at a vertical track mount.

The carriage unit 101 may simply be a component having an engagement portion or slot 102*a* and a threaded portion 102*b*. The threaded portion 102*b* receives the threaded spindle 106 and enables travel of the carriage unit 101 along the spindle 106 while the engagement portion 102*a* receives a decking beam 110 thereat. As seen in FIGS. 3-5, the engagement portion 102*a* may be a slotted opening in a face of the carriage unit 101 configured to receive an end of a decking beam 110, such as for example, via retaining tabs 110*a*. The engagement portion 102*a* of a carriage unit may substantially resemble an engagement point of a traditional vertical track mount so as to receive a universal decking beam. Alternatively, the engagement portion 102*a* may be any suitable configuration for receiving either a universal decking beam or a load bar specifically designed for any cargo decking elevation system.

Within the shroud 120, a threaded spindle 106 attached to the bearing mount 108 at one end is free to rotate. As the threaded spindle 106 rotates, the spindle nut assembly 102 attached thereat travels along the spindle 106 according to the threading of the spindle 106. For example, the spindle 106 may be configured to enable upward travel of the spindle nut assembly 102 via clockwise rotation and downward travel via counterclockwise rotation, or vice versa.

Figure 8:
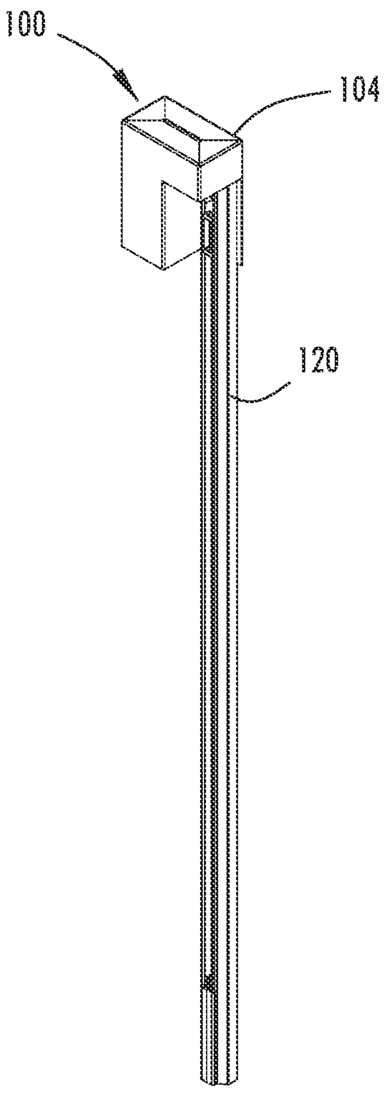
FIG. 8 is a front upper perspective view of a lift assembly.

The motor 104 is shown in FIGS. 8 and 9 is an assembly that is attached at a top portion of the spindle 106 opposite the bearing mount 108 is controllably operated to rotate the spindle 106. The motor 104 may be any electrically powered motor that is powerful enough to raise and lower the weight of the decking beam 110 and loaded cargo. For example, the system may be configured to hold 2,000 pounds per decking beam or 4,000 pounds per pair of decking beams if cargo is laid across multiple decking beams. The motor assembly 104 may include a motor body 104*a* and a motor shroud 104*b* to protect the motor from dust, debris, shifting cargo, or any other hazard within the cargo area.

Figure 6:
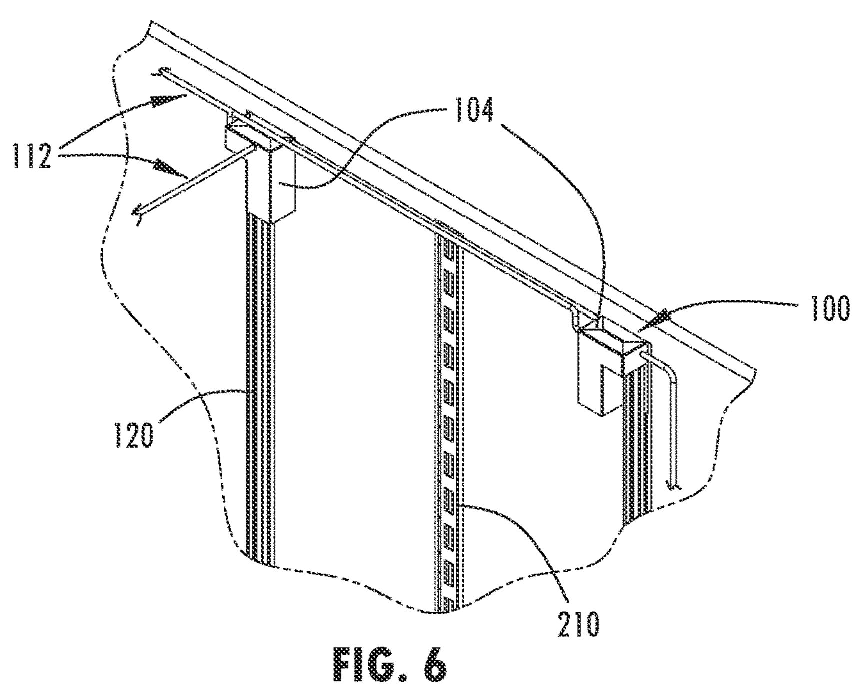
FIG. 6 is an enlarged view of an upper section of the cargo trailer having the cargo decking elevation system shown FIG. 1.
Figure 7:
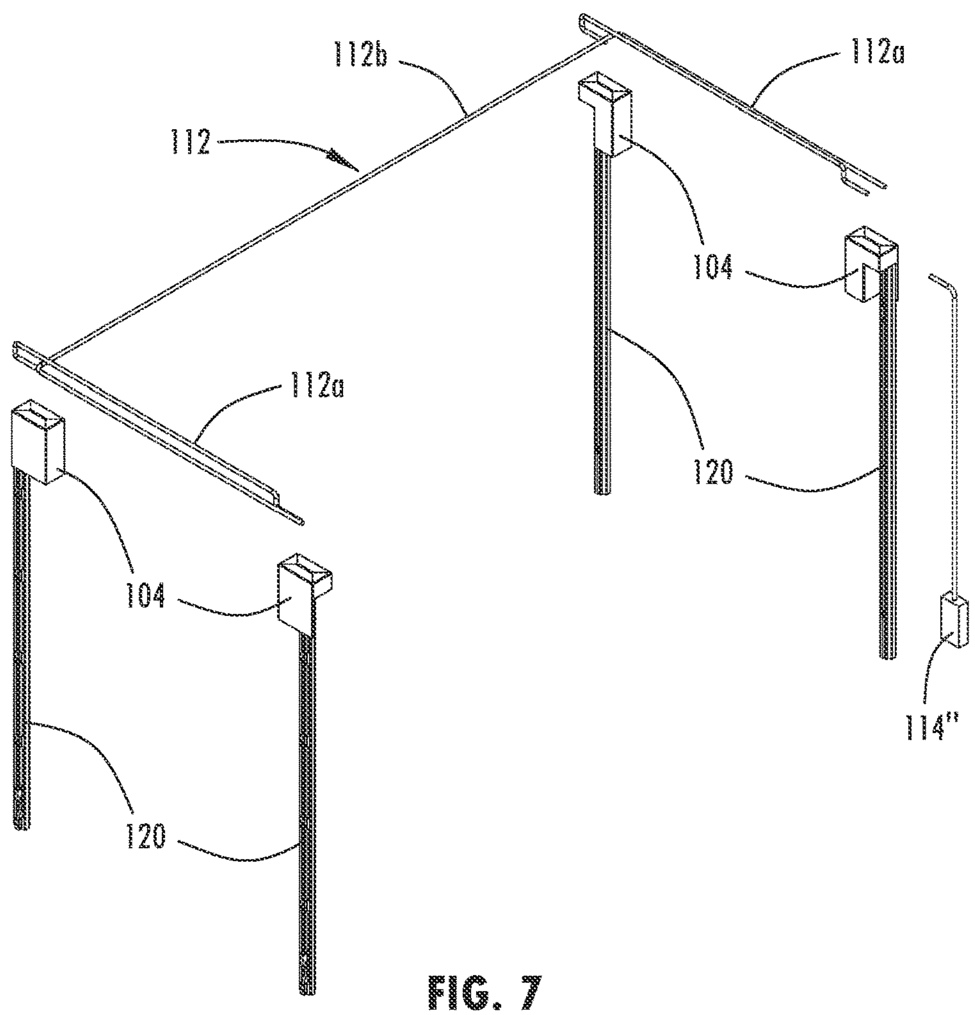
FIG. 7 is an exploded view of a cargo decking elevation system.

With reference to FIGS. 6 and 7, multiple motors 104 and corresponding assemblies (and therefore lift assemblies) may be wired together via a wire harness 112 or other electrical connection means to connect the actuating mechanisms. The wired connection or other electrical connection means ensures synchronized movement of lift assemblies connected via a shared decking beam and/or synchronized movement of neighboring lift assemblies so that multiple decking beams may be raised and lowered in unison. For example, the lift assemblies may be connected together in a wireless or wired manner, such as using a wired daisy chain connection system presenting a central hub or controller or switch. The wire harness may comprise both a power harness 112*a* and a sync harness 112*b*, where the power harness connects neighboring lift assemblies and the sync harness connects lift assemblies configured to lift different ends of the same decking beam. In some examples, the sync harness connects multiple systems together, such as to connect multiple pairs of lift assemblies together in a daisy chain configuration along the length of the cargo compartment.

As shown in the illustrated embodiment, a user may control the raising and lowering of the lift assemblies via a controller or switch 114 at each lift assembly or group of assemblies or via a master switch configured to control each lift assembly within an entire cargo area. For example, FIG. 2A depicts a master switch 114' at the rear opening of the trailer connected to each individual or grouping of lift assemblies and configured to individually control each lift assembly or grouping of lift assemblies. FIG. 7 depicts a switch 114" configured to only control the grouping of four lift assemblies in that illustrated embodiment. The switch or switches may be electrically wired to the lift assemblies and present buttons for user inputs to raise and lower the lift assemblies. The switch or switches may also be in wireless communication with the lift assemblies and/or present any other suitable method for controlling the lifter assemblies (such as a remote control device or an app on a mobile phone).

Preferably, the controller or switch 114 is a master switch at the rear opening of the trailer or cargo area configured to individually control each lift assembly (where a lift assembly includes two lift assembly on vertical track mounts on opposite walls of the cargo area with a decking beam disposed between). As seen in FIG. 2A, the switch 114' presents buttons or user inputs for raising and lowering the decking beam connected to the lift assembly to any discrete position. The switch 114 may include an electronic control unit (ECU) for receiving user input signals via the buttons or inputs at the switch and communicating command signals to a designated lift assembly. Alternatively, the switch 114 may be programmed with preset commands for the lift assemblies to ensure even, proper, or desired alignment of the decking beams 110 upon a raising or lowering maneuver. For example, the switch 114 may be programmed to, when the decking beam 110 is in a fully lowered position and upon receiving a user input to raise the decking beam 110, raise the bar only to a half or three-quarter height. The switch may also be programmed with preset maximum or minimum heights (even when the system is capable of raising or lowering the bars substantially within the entire height of the equipped cargo area) for raising or lowering the decking beams to reduce the risk of crushing cargo either at the roof or underneath the decking beams. Groupings of lift assemblies may be operated in tandem to raise or lower a cargo that spans several neighboring lift systems. The switch may be programmed to operate multiple lift assemblies at once, either via preset wiring to those lift assemblies, through user input that those lift assemblies should be controlled in tandem, or any other suitable means.

In additional examples, the controller or switch 114 may include user outputs, such as a display, an electronic readout, a light indicator, a speaker, or the like. For example, the user outputs may be configured to provide the user with information relevant to operation of the lift assemblies, such as the decking height, the position of the decking beam relative to the floor, the load supported by the lift assemblies, the status of any lighting units, or other sensor information that the system receives.

Thus, a cargo decking elevation system is provided that includes a plurality of vertical track mounts, a decking beam disposed between two vertical track mounts, a lift unit or assembly disposed at two vertical track mounts, and a controller configured to receive user inputs and, responsive to user inputs, raise or lower the decking beam via the lift assembly. The lift assembly includes a decking beam engagement element configured to engage and retain an end of a decking beam. Lifting means are configured to raise or lower the decking beam engagement element along a guide. Responsive to user inputs at the controller, the lifting means raise or lower the decking beam engagement element. The lift assembly may include a spindle nut assembly configured to receive the decking beam at an engagement portion and a threaded spindle at a threaded portion. A motor attached at an end of the threaded spindle is configured to rotate the threaded spindle about a bearing attached at the other end of the spindle. The spindle nut assembly travels along the threaded spindle responsive to rotation of the spindle by the motor. The controller receives user inputs and, responsive to the user inputs, provides commands to the motors to raise or lower the decking beam engaged at the spindle nut assembly.

Optionally, a sensor or sensors may be incorporated in the lift assemblies to sense weight or load of the carried loads. For example, sensor or sensors may be configured to sense the weight or load at each of the decking beams and/or across multiple decking beams to determine if the loaded weight exceeds a safe maximum weight and/or the maximum capability of the system. The sensor or sensors may also determine if the load is shifting or has shifted during transport. In additional examples, the senor may include other types of sensors, such as light sensors, cameras, door ajar sensor, or the like. Responsive to a given sensor output, the system may provide an output (via the switch, controller, and/or a display in communication with the system) that communicates a message to a user. For example, the message may be a warning alert or the weight measured by the sensor connected to the lift assemblies.

Optionally, the lift assemblies may enable additional electrical functionality within the cargo area. Typically, electrical functionality within cargo areas is limited and/or concentrated in a given portion of the cargo area (such as near the cargo opening or at the back of the cargo area close to the cab of the equipped vehicle). Placement of lift assemblies, and therefore wiring and/or motor assemblies, throughout the cargo area enables connection of other electrical components in the cargo area such as lighting components. Generally, lighting is limited in the cargo area of trucks, causing difficult and dangerous loading and unloading of cargo, particularly at night. The present disclosure enables the integration of overhead lights and/or lighting units at motor assemblies to provide lighting throughout the cargo area. In one example, a lighting unit having a light source, such as a light bulb or LED or the like, is disposed at an upper portion of a lift assembly. In another example, a lighting unit having a light source, such as a light bulb or LED or the like, is integrated into the cargo space and electrically connected to a lift assembly or the cargo decking elevation system.

Optionally, the hardware of a cargo decking elevation system may enable attachment of additional components, such as tie-down straps, cargo netting, or any other suitable materials used in the transport of cargo. For example, the decking beams or vertical track mounts or spindle nut assembly or any other component may provide an attachment point for tie-down straps to further secure cargo to a decking beam during raising and lowering of the system.

For purposes of this disclosure, the term "coupled" or "attached" (in all of their forms, e.g., couple, coupling, coupled, attach, attaching, attached, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A cargo decking elevation system comprising:

a pair of lift assemblies configured to be disposed at opposing walls of a transportation cargo compartment, wherein the pair of lift assemblies are configured as independently installable modular units that attach to existing structural features on the opposing walls of the transportation cargo compartment, wherein the pair of lift assemblies each comprises a carriage unit, and wherein at least one of the pair of lift assemblies comprises an actuating mechanism operably coupled with the carriage unit of the respective lift assembly for raising and lowering the carriage unit along one of the opposing walls;

a decking beam spanning between and engaged at the carriage units of the pair of lift assemblies; and a controller configured to receive inputs from a user for providing commands to the actuating mechanism of the pair of lift assemblies, wherein, responsive to user inputs at the controller, the actuating mechanism operates to raise or lower the decking beam relative to the opposing walls via the carriage units.

2. The cargo decking elevation system of claim 1, wherein each lift assembly comprises an elongated guide engaged with the carriage unit, and wherein the carriage unit is movable vertically along the elongated guide.

3. The cargo decking elevation system of claim 2, wherein at least one of the elongated guides comprises a threaded spindle and the carriage unit comprises a spindle nut assembly with a threaded portion engaged with the threaded spindle.

4. The cargo decking elevation system of claim 3, wherein the actuating mechanism comprises a motor attached at an upper end portion of the threaded spindle and operable to rotate the threaded spindle, and wherein, responsive to rotation of the threaded spindle, the spindle nut assembly travels along the threaded spindle.

5. The cargo decking elevation system of claim 4, wherein the spindle nut assembly comprises an engagement portion that receives an end of the decking beam, and wherein, responsive to user inputs at the controller, the motor rotates the threaded spindle to raise or lower the decking beam.

6. The cargo decking elevation system of claim 1, wherein ends of the decking beam each comprise a retaining tab configured to engage an engagement portion of the carriage unit.

7. The cargo decking elevation system of claim 1, wherein each of the pair of lift assemblies comprises an actuating mechanism operably coupled with the carriage unit of the respective lift assembly, and wherein the controller is configured to communicate with the actuating mechanisms of the pair of lift assemblies for simultaneous raising or lowering the carriage units to move the decking beam in a fixed orientation.

8. The cargo decking elevation system of claim 1, further comprising a lighting unit disposed at one of the pair of lift assemblies or electrically connected to at least one of the pair of lift assemblies.

9. The cargo decking elevation system of claim 1, further comprising a sensor disposed at at least one of the pair of lift assemblies and configured to determine a load supported by the decking beam.

10. The cargo decking elevation system of claim 1, wherein each lift assembly comprises a track and a threaded spindle disposed adjacent to and along the track, and wherein the carriage unit is movably engaged with the track and theadably engaged with the threaded spindle for the carriage unit to move linearly along the track in response to rotational movement of the threaded spindle.

11. The cargo decking elevation system of claim 1, further comprising a second pair of lift assemblies configured to be disposed at the opposing walls of the transportation cargo compartment and engage a second decking beam at spaced distance from the first decking beam, wherein responsive to user inputs at the controller, the first and second pairs of lift assemblies operate simultaneously to raise or lower the first and second decking beams in horizontal alignment to support a cargo item suspended between the first and second decking beams.

12. A system comprising:

a transportation cargo compartment having a floor and walls extending along opposing longitudinal edges of the floor;

a plurality of lift assemblies disposed at the walls of the transportation cargo compartment and arranged in pairs spaced along a longitudinal extent of the transportation cargo compartment, wherein each lift assembly is installed in the cargo compartment by releasably attaching to existing mounting features at the walls of the transportation cargo compartment, each lift assembly comprising:

an elongated guide vertically disposed at one of the walls;

a carriage unit movably engaged with the elongated guide; and an actuating mechanism disposed at an upper portion of the elongated guide and operably coupled with the carriage unit, the actuating mechanism configured to vertically displace the carriage unit along the elongated guide;

a decking beam spanning between a pair of the plurality of lift assembles with ends of the decking beam engaged at the respective carriage units; and a controller configured to receive inputs from a user for providing commands to a pair of the plurality of lift assemblies, wherein, responsive to user inputs at the controller, the pair of lift assemblies raise or lower the decking beam.

13. The system of claim 12, wherein the elongated guide comprises a threaded spindle and the carriage unit comprises a spindle nut assembly with a threaded portion engaged with the threaded spindle.

14. The system of claim 13, wherein the actuating mechanism comprises a motor attached at an upper end portion of the threaded spindle and operable to rotate the threaded spindle, and wherein, responsive to rotation of the threaded spindle, the spindle nut assembly travels along the threaded spindle.

15. The system of claim 14, wherein the spindle nut assembly comprises an engagement portion that receives an end of the decking beam, and wherein, responsive to user inputs at the controller, the motor rotates the threaded spindle to raise or lower the decking beam.

16. The system of claim 13, wherein the elongated guide further comprises a shroud disposed along the threaded spindle.

17. The system of claim 12, wherein, responsive to user inputs at the controller, the plurality of lift assemblies simultaneously raises or lowers two or more decking beams.

18. The system of claim 12, further comprising a sensor disposed at the pair of lift assemblies and configured to determine a load supported at the decking beam wherein, responsive to placement of a load at the decking beam, the sensor determines the load at the decking beam and generates an output regarding the determined load.

19. The system of claim 12, further comprising a lighting unit electrically coupled to at least one of the plurality of lift assemblies and configured to illuminate an interior of the transportation cargo compartment.

20. A cargo decking elevation system comprising:

a plurality of vertical track mounts disposed at opposite, facing interior wall surfaces of a cargo compartment, wherein the plurality of vertical track mounts are each configured for removable attachment to existing mounting features at the interior wall surfaces;

a decking beam extending between two of the plurality of vertical track mounts;

a lift assembly disposed at each of the plurality of vertical track mounts and attached to ends the decking beam, the lift assemblies configured to raise and lower the decking beam; and a controller configured to receive inputs from a user for providing commands to the lift assemblies, wherein, responsive to user inputs at the controller, the lift assembly raises or lowers the decking beam.

* * * * *